United States Patent [19]

Bonyhard

[11] 3,751,597

[45] Aug. 7, 1973

[54] TIME DIVISION MULTIPLEX NETWORK SWITCHING UNIT

[75] Inventor: Peter Istvan Bonyhard, Edison, N.J.

[73] Assignee: Bell Telephone Laboratories, Incorporated, Berkeley Heights, N.J.

[22] Filed: Dec. 30, 1971

[21] Appl. No.: 214,269

[52] U.S. Cl. .................... 179/15 AQ, 340/174 TF

[51] Int. Cl. .................... H04j 3/00

[58] Field of Search .................... 179/15 AQ; 340/174 TF

[56] References Cited

UNITED STATES PATENTS

| | | | |
|---|---|---|---|
| 3,602,647 | 8/1971 | Kawashima | 179/15 BS |
| 3,597,548 | 8/1971 | Drinnan | 179/15 AT |
| 3,705,266 | 12/1972 | Philip | 179/15 AT |
| 3,461,242 | 8/1969 | Inose | 179/15 AQ |
| 3,458,659 | 7/1969 | Sternung | 179/15 AQ |
| 3,263,030 | 7/1966 | Stiefel | 179/15 AT |

*Primary Examiner*—Kathleen H. Claffy
*Assistant Examiner*—David L. Stewart
*Attorney*—W. R. Keefauver

[57] ABSTRACT

A time slot interchanger has an input signal delay path of selectable delay coupled to an input thereof. An input signal converter receives, in electrical form, different time division multiplex input signals in parallel and applies them, in magnetic single-wall domain form, to the time slot interchanger input in series through the selected delay for that interchanger. A plurality of such switching units are interconnected at corresponding signal positions of their respective converters; and the converters of the respective interchangers are controllably enabled to respond to the electrical signals in sequence in different time slots of the time division multiplex input signals. The time slot interchanger input delays are selected in accordance with the converter enabling sequence, so that all time slot signals of a single frame from any particular time division multiplex input signal arrive in parallel at the inputs to their respective time slot interchangers.

13 Claims, 3 Drawing Figures

TIME DIVISION MULTIPLEX NETWORK SWITCHING UNIT

BACKGROUND OF THE INVENTION

1. Field of the Invention

This invention relates to time division multiplex signal switching networks; and it relates, in particular, to a switching unit which is useful for modularly constructing such networks.

2. Description of the Prior Art

Various techniques are known in the art for performing signal path switching in time division multiplex signal communication networks. Recently one switching technique has been suggested wherein the path switching function is performed by time slot interchanging hardware to facilitate the implementation of the switching function in planar switching technologies, such as the magnetic single-wall domain technology. Such a switching technique is disclosed and claimed in the copending R. S. Krupp- L. A. Tomko application Ser. No. 212,089, filed on Dec. 27, 1971, entitled "Time Division Multiplex Switching System Utilizing All Time Division Techniques," and assigned to the same assignee as the present application.

The aforementioned time division switching technique utilizes alternate stages of time slot interchangers and mass series-parallel converters for achieving the switching function. When such a switching network is implemented in magnetic single-wall domain, or bubble, technology, magnetic-to-electric-to-magnetic signal mode conversion would usually be employed at the interface between successive stages of the network. Furthermore, some previously suggested implementations for single-wall domain interchangers and converters could be at least inconvenient for use with time division multiplex signals having as few as two signal bits per time slot signal because of a strong possibility of interference among adjacent, data signal and control signal, propagation paths. The option of being able to realize a system with a small number of bits per time slot is advantageous in that it permits the use of domain materials that are capable of only relatively low bit rates of domain propagation.

It is, therefore, one object of the present invention to improve time division multiplex signal communication systems.

It is another object to reduce the number of interstage signal mode conversions required in time division switching networks.

A further object is to facilitate the implementation of time division multiplex switching networks in planar shifting technologies such that operation can be extended to applications involving a relatively small number of signal bits per time slot as well as those involving larger time slot words.

SUMMARY OF THE INVENTION

The foregoing objects are realized in an illustrative embodiment of the invention in which at least one time slot interchanger includes a unique signal delay path in the input thereof. A differnt plurality of signal converters is also provided in the interchanger input for receiving a plurality of electric signals in parallel and converting them to a magnetic single-wall domain serial representation of the same signals. The latter serial representation is applied through the delay to such time slot interchanger.

It is one feature of the invention that a network switching stage comprising plural time slot interchangers having their signal converters interconnected as a hybrid electric-magnetic matrix allows network operation with a small number of signal bits per time slot.

It is another feature that the employment in the input of each time slot interchanger of plural signal converters for the plural input signals eliminates a magnetic-to-electric-to-magnetic signal mode conversion interface at that point of the network.

A further feature is that a set of noninterfering control memory storage loops are provided for a magnetic single-wall domain time slot interchanger; and they are coupled to the interchanger through different domain propagation delays. However, there is a uniform total delay from a common address insertion input signal point for all of the loops to the output end of the time slot interchanger input shift register.

It is yet another feature that control signal contents of a group of control memory loops are erased for a particular time slot by collapser loop circuits linking predetermined corresponding time slot positions in each control memory loop of the group.

BRIEF DESCRIPTION OF THE DRAWINGS

A more complete understanding of the invention and the various features, objects, and advantages thereof may be obtained from a consideration of the following detailed description in connection with the appended claims and the attached drawings in which:

DETAILED DESCRIPTION

Figure 1:
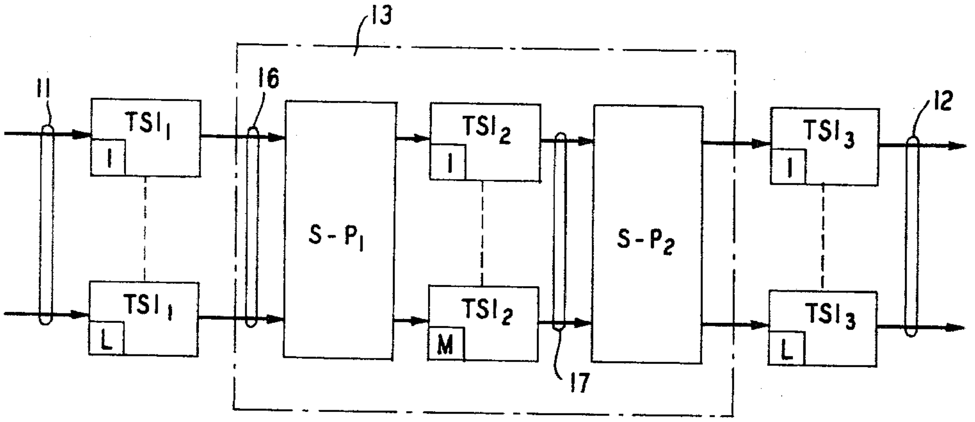
FIG. 1 is a simplified block and line diagram of a prior art three-stage time division multiplex switching network in which the invention is advantageously employed.

The time division switching network of FIG. 1 is of the type which is disclosed in detail and claimed in the aforementioned Krupp et al. application. It illustrates a type of switching technique which is useful in the small network indicated in FIG. 1, and which is extendible to the implementation of more complex switching networks, as is also indicated in the Krupp et al. application. Such a network provides selectable communication paths between calling and called subscriber stations, not shown.

Three stages of time slot interchangers are included in the network of FIG. 1, and they are interconnected in tandem by two stages of mass series-parallel converters. The respective interchanger stages are indicated by the reference character TSI, with a subscript indicating the interchanger stage number. L such interchangers are included in the stage $TSI_1$ and in the stage $TSI_3$. M interchangers are included in the stage $TSI_2$. Similarly the series-parallel converter stages are indicated by the reference character S-P with a subscript indicating the converter stage number. For the relatively simple network of FIG. 1, a single converter is shown in each converter stage.

A mass series-parallel converter performs a two-dimensional shift register type of function in that it takes, from any given converter input line, a frame of time division multiplex signals which are presented in time slot series. The converter further presents those signals in time slot parallel on plural converter output circuits in a single time slot, which time slot is different for each converter input line. Thus, in effect, the mass series-parallel converter can be said to converter input line number to converter output time slot number and vice versa. When converters of this type are combined with time slot interchangers in the manner indicated in FIG. 1, it is possible to perform signal path switching by means of time slot interchangers. It also becomes relatively convenient to implement the switching network in one of the planar shifting technologies.

In order to establish a signal communication path through the network of FIG. 1 from one of L input time division multiplex signal paths 11 to one of L output time division multiplex signal paths 12, the calling and called path and time slot number for the calling and called stations served by the network are provided in accordance with well-known techniques for operating switching networks. The remaining information, which is necessary to define a path through the network is advantageously obtained by techniques described in the aforementioned Krupp et al. application. Thus, a matching arrangement is utilized to determine a common available time slot in the output of the calling path time slot interchanger in stage $TSI_1$, and in the input to the called path time slot interchanger in stage $TSI_3$. This common time slot is designated an operating time slot $TS_{op}$, and it is used for both the output time slot $TS_o$ in the stage $TSI_1$ and the input time slot $TS_i$ in stage $TSI_3$. Furthermore, the time slot number $TS_{op}$ is the same as the number of the time slot interchanger of stage $TSI_2$ which must be used between the converters of stages $S\text{-}P_1$ and $S\text{-}P_2$. The input and output time slot numbers for that stage $TSI_2$ interchanger are automatically fixed by the nature of the network, since the input time slot number must be the same as the line number of the calling path interchanger in stage $TSI_1$; and the output time slot number must be the same as the number of the called path interchanger of stage $TSI_3$. The interchanger of stage $TSI_2$ is operated in the usual manner, for the particular type of interchanger employed, to accomplish the signal time slot shift between those input and output time slot numbers.

The combination of converter stage $S\text{-}P_1$, interchanger $TSI_2$, and converter stage $S\text{-}P_2$, operating in the manner just outlined, is sometimes called a time shared space division switch. In FIG. 1 that combination is designated as the time shared space division switch 13. If the network of FIG. 1 is implemented in devices within the magnetic single-wall domain technology, it generally includes a magnetic-to-electric-to-magnetic transducing function at each interface between time slot interchangers and mass series-parallel converters. In the subsequent discussion of FIG. 2 it will be shown how to eliminate such a transducing function at interfaces which include the output of a series-parallel converter; and this implementation will be accomplished in a way that is convenient for systems employing either small or large numbers of signal bits per time slot.

Figure 2:
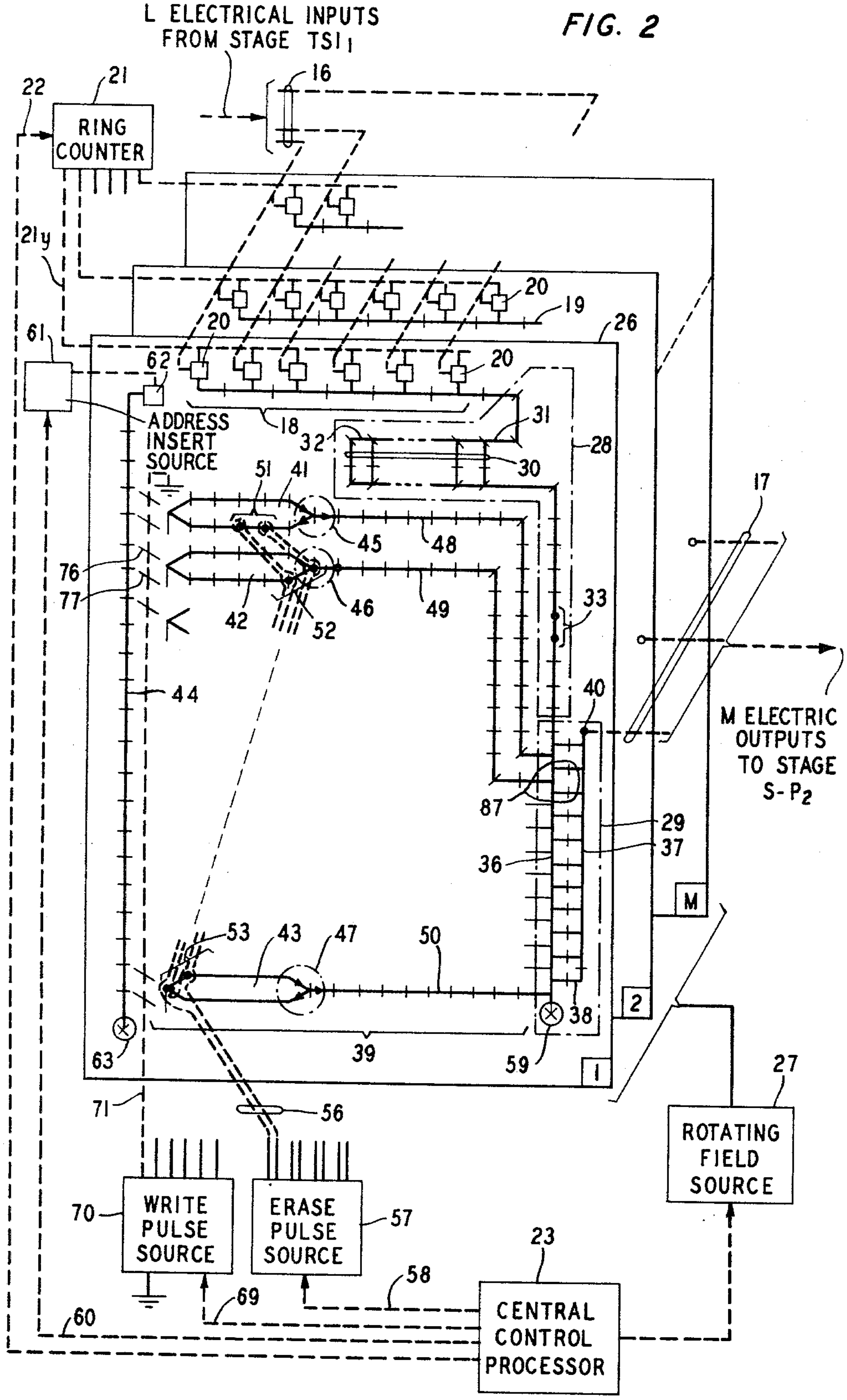
FIG. 2 is a schematic diagram of a switching unit in a network stage in accordance with the invention.

In FIG. 2 there are shown a plurality of time slot interchangers of a switching network stage and a mass series-parallel converter which is combined therewith. These network elements are implemented principally in the magnetic single-wall domain technology. Each interchanger is located in a separate one of M network planes and includes its interchanger shift registers along with the control memory arrangements for operating the interchanger and address insertion arrangements for writing control signal patterns into the control memory also on the same plane is a portion of the arrangements for performing the series-parallel conversion that is combined into the interchanger stage. One such interchanger plane will be described in detail, and the other are all the same except in regard to one aspect which will be hereinafter described.

For convenience of description, it is assumed that the interchangers illustrated in FIG. 2 are those of the FIG. 1 stage $TSI_2$ and that the functions of the converter stage $S\text{-}P_1$ are included in the figure. Thus, L electrical input circuits or paths 16, illustrated in broken-line form to facilitate distinguishing them from magnetic domain propagation paths, are provided at the top of FIG. 2. These are the electrical outputs from the L interchangers of stage $TSI_1$. Similarly, M electric circuits 17 comprise the stage $TSI_2$ output circuits to the converter stage $S\text{-}P_2$.

Each of the circuits 16 constitutes a different row circuit of a hybrid signal coupling matrix having, as the column circuits thereof, different magnetic single-wall domain propagation paths, or shift registers, such as the registers 18 and 19 in FIG. 2. The row circuits and column registers are connected at crosspoint intersections thereof by signal mode converters 20 which are, in the illustrated embodiment, electrically controlled, magnetic single-wall domain, generation units. Those units are illustrated in greater detail in FIG. 3.

Each domain generation unit includes a combination of an electrically controlled domain generator 24 and an electrically controlled domain collapser 25 in tandem in the fashion of a logical AND gate. Thus, domains reach a stage of a domain propagation shift register in the collapser output only when both the generator and the collapser are appropriately activated.

Figure 3:
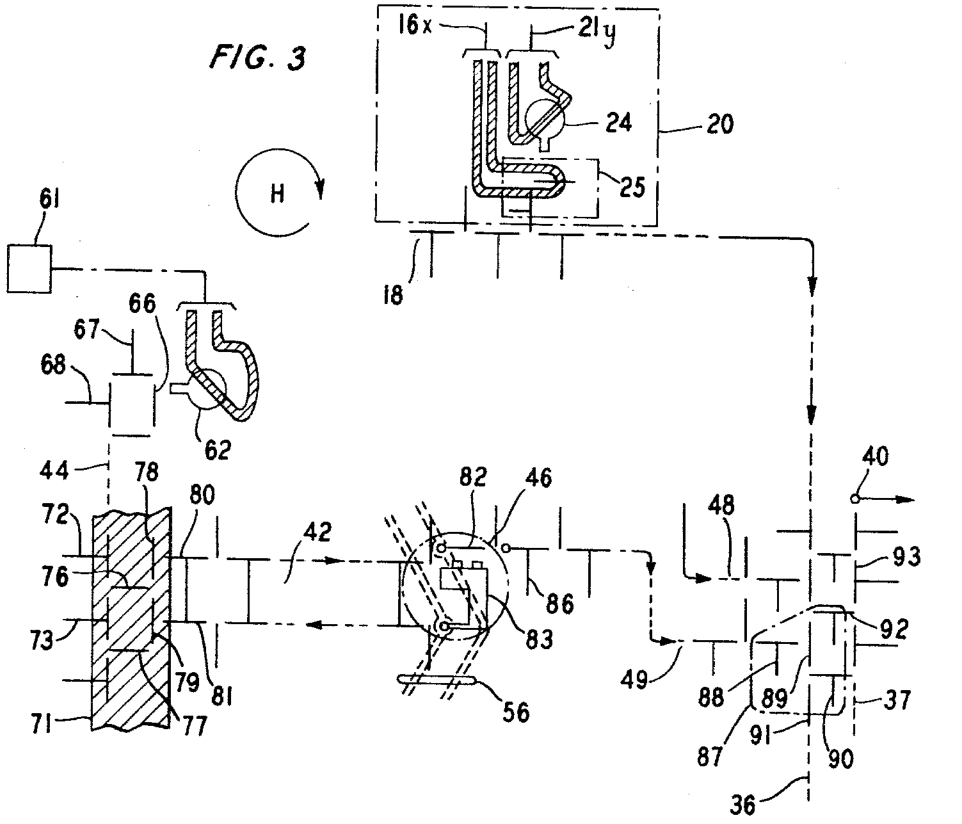
FIG. 3 is a partial schematic diagram providing further detail of certain parts of the switching unit of FIG. 2.

The generator and collapser are field access circuits that receive signals on circuits $21_y$ and $16_x$, respectively, in FIG. 3 during appropriate phases of an in-plane rotating magnetic field H for accomplishing the generating and collapsing functions, respectively. Such a generating arrangement is found in my copending application Ser. No. 882,137, filed Dec. 4, 1969, now U.S. Pat. No. 3,611,331, issued Oct. 5, 1971, entitled "Single Wall Domain Source"; and an illustrative collapsing arrangement is found in the copending Bonyhard et al. application Ser. No. 875,338, filed Nov. 19, 1969, now U.S. Pat. No. 3,618,054, issued Nov. 2, 1971, entitled "Magnetic Domain Storage Organization." Both such applications are assigned to the same assignee as the present application.

The domain generators in the crosspoint, domain generation units associated with each column shift register of the hybrid matrix are recurrently actuated in parallel for each column register by a different output from the respective stages of a ring counter 21 in FIG. 1. That counter is continuously driven at the input signal time slot rate by timing signals provided to the counter on a circuit 22 from a timing output of a central control processor 23. The processor operates to exercise overall operative control of the switching network in accordance with network operation techniques of types that are now well known in the art and comprise no part of the present invention. Each output, e.g., $21_y$, from the ring counter 21 causes all of the domain generators connected to that output to produce a magnetic domain, and that domain is coupled to the corresponding column shift register of the hybrid matrix whenever a binary ONE electrical signal is simultaneously presented from the corresponding row circuit, e.g., 16$_x$, to the domain collapser of the same domain generation unit.

The time slot signals in each time slot on the circuits 16 in FIG. 2 are applied to the domain generation units of all crosspoints connected to the respective row circuits. Electric circuits of domain generators along a matrix row are advantageously connected in series from the respective circuit 16 to a current return path not shown. Signals are applied to the domain collapser 25 at each crosspoint with polarity such that a binary ONE signal inhibits the operation of the collapser, but a binary ZERO signal is of appropriate polarity to operate the collapser. Thus, the binary ONE electrical signal on one of the circuits 16 is converted to a magnetic single-wall domain in a corresponding stage of the one of the matrix column registers that has its generation unit enabled in that time slot. Each such register is enabled to receive such signals in a recurrent sequence by the ring counter 21. Consequently, successive parallel combinations of time slot signals from the circuits 16 are loaded into the different column registers of the hybrid matrix.

The various domain propagation paths for the switching unit illustrated in FIG. 2 are advantageously of the field access type. Each of the M planes illustrated in FIG. 2 comprises one switching unit and includes a substrate slice of magnetic material which is capable of serving as host for the generation and propagation of single-wall magnetic domains. Propagation paths within the substrate, such as substrate plane 26 in the first plane in FIG. 2, are advantageously defined by iterative patterns of magnetic T and bar overlay elements deposited on the substrate. The group of substrates is immersed in a reorienting inplane magnetic field in the planes of the substrates as provided by a rotating magnetic field source 27 which operates in synchronism with the central processor 23. This field advantageously rotates at the signal bit rate of the time division signals received on circuits 16. Field access domain propagation paths of the type just described are disclosed in greater detail in A. H. Bobeck U.S. Pat. No. 3,534,347.

In plane 26 of FIG. 2, the column shift register 18 propagates domains loaded therein to a delay section 28 in the domain propagation path to the input of a time slot switcher 29 that is included within the time slot interchanger. A portion of the propagation path in the delay section 28 is advantageously folded into a configuration resembling a hairpin wherein domains are propagated to the left, then downward for one field cycle, and then to the right again before turning downward, as viewed in FIG. 2, toward the time slot switcher 29. In the hairpin portion of the delay path, each time slot position includes two paths, for the two-bits-per-time-slot embodiment, in a group 30 of branch propagation paths extending between corresponding domain positions on opposite sides of the hairpin configuration. The preferred domain propagation path is in the path which defines the hairpin. However, a selectable part of that path, such as for example one of the parts 31 and 32, is removed in order to force domains to follow a particular one of the branch propagation paths of the group 30 and thereby undergo a reduced amount of delay in reaching the switcher 29.

For example, a laser beam, not shown, is advantageously employed to burn off the magnetic overlay comprising the section 31, and thereby force domains to bypass substantially the full extent of the hairpin to realize the shortest delay between register 18 and switcher 29. This would be the delay that would be utilized for time slot interchangers in the stage TSI$_1$ of FIG. 1; and it also would be utilized for any stage time slot interchanger which normally receives the final time slot word of a frame of the signals from the respective input circuits 16. Similarly, if the hairpin section 32 were destroyed, the domains from register 18 would experience an intermediate degree of delay in reaching switcher 29; and if none of the hairpin sections were removed, domains would experience the maximum delay in reaching switcher 29. That maximum delay corresponds to the delay which is used in the input for any stage time slot interchanger, except in stage TSI$_1$, that normally receives the initial time slot word of a frame from the circuits 16. For example, if counter 21 enables domain generation units 20 of the first through the Mth switching unit planes of FIG. 2 in that sequence, the front plane switching unit has the maximum delay in its section 28; and the back, or Mth, plane has the least delay. The full range of delays is configured so that a full frame of successive signals on one of the circuits 16 arrives simultaneously at inputs to the respective switching unit time slot switchers 29.

The time slot interchanger illustrated in the switching unit of FIG. 2 operates on a two-bits-per-time-slot signal basis. A domain position pair 33 indicated, near the end of the delay section 28, by enlarged dots comprises a reference input domain position. That reference position is indicated to facilitate the description of various time slot interchanger operations and is the position in which input domains appear in their own time slots. Switcher 29 in the time slot interchanger is of the type described in a copending application of R. S. Krupp and L. A. Tomko, Ser. No. 204,143, filed Dec. 2, 1971, entitled "Dynamically Switching Time Slot Interchanger," and assigned to the same assignee as the present application. This switcher includes an input shift register 36 and an output shift register 37 which are interconnected between corresponding stages by a plurality of branch propagation paths, such as the path 38 specifically designated at the end of the input shift register 36.

In the two-bits-per-time-slot embodiment such branch coupling paths are included at every stage, i.e., at every time slot half word position. At each branch coupling path there is a control gate input from a control memory 39. A region at which such a control memory input, a branch coupling path, and the register 36 come together is a control gate; and one such gate, i.e., the gate 87, will be considered subsequently in greater detail in regard to FIG. 3. At such a control gate, an interaction occurs between control signal domains provided by the control memory and data domains propagating along the register 36. When such an interaction takes place, the data domains are diverted into an adjacent branch coupling path so that they reach the output shift register 37. Domains in the latter register are propagated upward, as illustrated in the drawing, toward a detector 40 of any well-known type. In that detector the train of domains from the register 37 is converted into a corresponding binary coded electric signal pulse train for application to the corresponding one of the output circuits 17.

Time slot switcher 29 has a central reference gating position, i.e., the sixth, through which a domain pair is switched when no time slot interchanging is required; and such a domain pair passes through there to detector 40 with only the basic inherent switcher delay. For the illustrated switcher, the inherent delay from position 33 through the reference gating position to detector 40 is sixteen domain positions, or rotating field cycles. In order to achieve time slot interchanging, control gates are operated to add to or subtract from the inherent delay. For example, a time slot delay of four time slots, eight cycles, is achieved by actuating the second control gate from the bottom of register 36 as shown in FIG 2.

Control memory 39 includes a plurality of separate recirculating control memory loop propagation paths such as the loop paths 41, 42, and 43 indicated in FIG. 2. Each loop path closes upon itself and is one full signal frame in length, i.e., a full frame time is required to propagate a domain through one complete circuit around the loop. Input to the loop is provided from a discrete pair of stages of an address insertion shift register 44 which will be subsequently described. Separated by one-half of a frame of signal propagation time from the address insertion input on each control memory loop is a domain fanout position, such as the fanout positions 45, 46, and 47 in FIG. 2. At each such fanout position a domain entering, for example from the upper portion of the loop 41 in the drawing, is split into two domains. One of those two domains continues to circulate in a clockwise direction in the loop 41, and the other one is propagated to the right in a coupling propagation path 48 to one of the gating regions of the switcher input shift register 36. A domain fanout position of the type just mentioned is disclosed in the copending I. Danylchuk application, Ser. No. 41,028, filed May 27, 1970, entitled "Single Wall Domain Fanout Circuit," and which is assigned to the same assignee as the present application.

The upper and lower parts of each control memory loop, as shown in the drawing, are spaced apart by a sufficient amount to prevent significant interaction between domains moving in opposite directions along those two loop portions. It has already been indicated that the control gate regions in register 36, and which are controlled by the respective control memory loops, are separated by only one-half of a time slot word, i.e., one bit position. Consequently, it is necessary for the loops to be spread to a greater extent than the spread which is represented by the length of register 36. This is the reason for the coupling propagation paths 48, 49, and 50. Those paths are advantageously of different lengths, such that the total domain propagation delay from an input to the address insertion shift register 44, through a control gate region on shift register 36, to a collapser 59 at the end of that register is the same through any one of the control memory loops and its associated coupling propagation path. Each such coupling path includes, in the orientation illustrated, a horizontal portion between the associated control memory loop fanout region and the controlled switcher gate region. All but one of the control paths also includes a vertical run to accommodate the larger spread of control memory loops where the loop width exceeds the length of the signal delay propagation path portion between adjacent gating regions on the register 36. The shortest coupling path is of sufficient length to allow for the various vertical portions in all of the other loop coupling paths.

A pair of domain positions are indicated by enlarged dots in corresponding time slot positions of each control memory loop. For example, the domain position pairs 51, 52, and 53 for the loops 41, 42, and 43 are shown in FIG. 2. These are corresponding domain position pairs because they represent positions at which control domain pairs would reside if they were to interact, at their respective associated controlled gate regions, with a pair of domains at the input reference position pair 33. To the extent that there is a difference between, on one hand, the number of domain positions from position pair 33 to one of the gate regions and, on the other hand, the corresponding position pair in the control memory loop controlling that region, the difference must be an integral number of frames of delay.

Thus, a pair of domains at the position pair 51 in loop 41 in a given time slot would meet at the first gating position in shift register 36 with a pair of domains which had been at the position pair 33 in the same time slot, but in different frames. Similarly, a first pair of domains at the input reference position pair 33 and a second pair at the control domain position pair 52 in loop 42 in the same time slot of different frames would meet at the second gate region 87 in shift register 36. Likewise, pairs of domains at the positions 33 and 53 in the same time slot would meet at the final gate position for shift register 36. The control domain pairs 51, 52, and 53 thus occupy control loop positions which correspond in a time sense. Since the control coupling paths, e.g., 48 through 50, are of different lengths, the corresponding control loop positions do not occupy positions in their respective loops which correspond in a geometrical or physical sense.

The time correspondence of control loop domain position pairs, as just outlined, is utilized to advantage by enclosing those corresponding positions in the control memory loops with an electric circuit 56 which is driven by an erase pulse source 57 for substantially simultaneously collapsing any domains which may exist in the corresponding domain position pairs of the respective control memory loops. The source 57 is actuated at selectable times by an output from the central processor 23 on a circuit 58 at selectable times which are determined in accordance with time-space path search operations for the network of FIG. 1. The circuit 56 is advantageously shown as extending along the right-hand side of the right-hand control domain position of each corresponding position pair, then returning along the left-hand sides of those positions before similarly extending around both sides of the left-hand positions of each pair prior to returning to the source 57.

Circuit 56 enclosures for substantially simultaneously collapsing domains are illustrated in detail in FIG. 3 for the control domain position pair 52 at the fanout circuit 46. In this specific format, circuit 56 is pulsed during a rotating field phase when the resultant magnetic field H is oriented to the left so that domains in the control position pair 52 occupy the enclosed domain positions indicated by small circles in FIG. 3 at the left end of a bar element 82 and at the lower left corner of a fanout overlay element 83. The erase current pulse is of a polarity to induce at each enclosed domain position a field which is perpendicular to the plane of the control memory substrate slice and which is directed in a sense that is opposed to the sense of magnetization of the enclosed domain. Thus, the induced field causes erasure of the enclosed domains.

An erase pulse is produced in the indicated field phase during the input time slot $TS_i$ for a call connection which is to be taken down. In that time slot the data information domains would reside in the input reference position 33. At least one pair of such data information domains for the frame during which control memory erasure took place would pass through the time slot switcher 29 in the regular manner previously established for the call connection. However, by the first or second frame following erasure, depending upon the control memory loop involved for a particular call connection, the absence of the control domain pair produces no interaction with the data domains at the corresponding gate in shift register 36. Consequently, those data domains are propagated through the full extent of register 36 to a domain annihilator 59 at the lower end of the register. Similar erase actions occur in other time slot interchangers of the interchanger stage illustrated in FIG. 2 as a result of similar erasing operations which produce erase pulses on other output circuits for the erase pulse source 57. However, in the network stage illustrated in FIG. 2 only one interchanger is erased at any time, and that erasure takes place just before setting up a new call connection.

A call connection advantageously remains connected, insofar as control memory contents are concerned, until such time as a new path search operation, supervised by processor 23, indicates that a particular time slot in a particular interchanger is needed for a new call connection. Other network arrangements, not shown but controlled by central control processor 23, are utilized during the path search operation to indicate that this particular time slot in this particular interchanger is, in fact, available for the establishment of a new call connection even though the control memory contents do not actually indicate that fact. For example, a path search dependent upon the use of busy bits as taught in the aforementioned Krupp et al. network application, or upon a network map in the central processor as is currently known for electronic switching systems is advantageously employed.

New control domain patterns are written into respective control memory loops through the cooperation of the address insertion shift register 44 which extends along the left-hand side of the time slot interchanger plane 26 in FIG. 2. For this purpose, the central control processor 23 determines the input time slot number $TS_i$ which is to be used by a prospective call connection for a particular time slot intercharger. In that time slot, the same time slot during which erase pulse source 57 is actuated, processor 23 causes a first time coded signal pulse to be applied to a circuit 60 for actuating an address insertion signal source 61. That source applies a pair of pulses in sequence to a domain generator 62 for entering a sequential pair of domains into the register 44. Alternatively, of course, source 61 can be arranged to inject a pair of pulses simultaneously into sequential locations at the input end of the register 44 for propagation therethrough in tandem. Generator 62 operates in response to the in-plane rotating field, and the same field causes domains produced by the generator 62 to be propagated downward through the register 44 toward a domain annihilator 63.

Circuit 60 is advantageously pulsed during the in-plane field phase when the resultant field is oriented upward for the specific implementation illustrated for the generator 62 in FIG. 3. Generator 62 is advantageously of the same type as generator 24 and appropriately biased so that a domain is produced only in response to a current pulse in proper phase on circuit 60. Each domain produced by the generator 62 is propagated during successive rotating field cycles through a magnetic overlay bar element 66 and the adjacent T elements 67 and 68 to place it into the field access T and bar propagation path of shift register 44. This domain pair thereafter propagates downward through a full frame of delay stages in the register 44 before reaching an input transfer point for the first control memory loop 41. The domain pair continues through register 44 until such time as the processor 23 applies a further time coded electric signal pulse on a circuit 69 for actuating a write transfer source 70.

Transfer source 70 produces on the one of its plural output circuits which controls address insertion transfer for the interchanger plane 26 a transfer current pulse during the output time slot $TS_o$, of the second frame following actuation of generator 62, for the prospective call connection through the interchanger. This output time slot is the time slot in which a signal at the input reference position 33, during the input time slot $TS_i$, should appear subsequently at the detector 40. The details of the portion of the domain transfer arrangement at the input to the control memory loop 42 are illustrated in FIG. 3 and are advantageously in accordance with the disclosure in the copending application of D. E. Kish and J. L. Smith, Ser. No. 128,889, filed Mar. 29, 1971, entitled "Single Wall Domain Memory Organization," and assigned to the same assignee as the present application.

Before considering the transfer details in FIG. 3 it is useful to observe the address insertion numerical relationship. Assume, for example, a five-time-slot interchange from $TS_i$=2 to $TS_o$=7. In the twenty-two cycles between the pulsing of circuits 60 and 71, the control domain pair from generator 62 reaches the control memory loop 43. Two cycles later the pair is in position 53, and from that point it is propagated to meet at branch propagation path 38 a data domain pair that was found in position 33 in input time slot No. 2. Interaction resulting from that meeting causes that same data domain pair to appear at detector 40 13 time slots, 26 cycles, after it has appeared in position 33. Those 26 cycles represent the 16 cycles of inherent switcher delay plus the ten cycles of the five-time-slot interchanging delay.

At the transfer point in FIG. 3 the domains to be transferred reside at the lower tips of crossbars of the register T elements 72 and 73, respectively. This condition exists when the rotating field resultant is oriented downward as is well known for field access shift registers. The T elements are associated with a pair of horizontal bar elements 76 and 77 which extend to the right toward the control memory loop 42. When the rotating field resultant is reoriented to its left direction, the domains reside at the left-hand tips of bars 76 and 77; and in that phase of the time slot $TS_o$, the transfer pulse is applied to the circuit 71. That pulse is of a polarity, with respect to the sense of domain magnetization, to attract domains toward the right-hand edge of conductor 71. The pulse is maintained while the field reorients to its upward direction and then to its right-hand direction so that the domains are forced to shift along the bars 76 and 77 to the right-hand tips thereof. At this point the transfer pulse is terminated.

Now as the rotating field reorients downward and then to the left again, the domain pair moves to the lower tips of a pair of bar elements 78 and 79 and then to the left-hand tips of the crossbars 80 and 81 on a pair of T elements which share a common shank portion in the control memory loop 42. Thereafter, the domain at the crossbar portion 80 is propagated to the right across the top of loop 42 as in the in-plane field is reoriented in successive cycles. At the same time, the domain from the crossbar element 81 is propagated to the upper tip of the bar 79, the right-hand tip of bar 76, the lower tip of bar 78, and the left-hand tip of bar 80 so that it may thereafter follow the leading domain of the pair in circulating through loop 42. The aforementioned transfer pulse on circuit 71 produces no domain transfers at any other control memory loop location because normal control memory writing operations allow only two control domains in the address insertion shift register 43 at any given time.

When control domains in loop 42 reach the fanout region 46 they are propagated therethrough in succession to maintain control memory loop recirculation, and they are also replicated so that a new domain pair is propagated into the control coupling path 49 toward the time slot switcher shift register 36. The fanout operation takes place for each domain as described, for example, in the aforementioned I. Danylchuk application. Briefly the three domain positions indicated by circles in FIG. 3 correspond to the three domain positions indicated by enlarged dots at the fanout region 46 in FIG. 2. Thus, an input domain at the left-hand tip of a bar element 82, when the in-plane field is oriented to the left, is stretched around the right-hand side of the fanout overlay element 83 as the field rotates through its upward, rightward, and lower reorientations. Thereafter, as the field reorients to its left-hand orientation, the stretched domain is broken into two domains which then reside at the left-hand tip of the crossbar on a T element 86 in the input to the control coupling pair 49 and in the lower left-hand corner of the fanout overlay element 83. These two new domains are then propagated to the right along path 49 and to the left along the lower half of loop 42 in the usual manner as the field reorients through successive cycles. The same operation is repeated for the second domain of the control domain pair.

Each control domain pair propagated through the path 49 ultimately reaches shift register 36 wherein it is propagated downward through that register to the domain annihilator 59 in FIG. 2. This course is normally followed by the control domain pairs whether or not there happen to be any domains in the two domain positions of the time slot word which is to be diverted at the interaction gating region 87 from shift register 36 to the shift register 37. Thus, each control domain is propagated successively across the crossbar at the top of a T element 88 through the lower tip of a bar element 89, through the left-hand tip of the crossbar on a T element 90 and into a further bar element 91 of the register 36.

If a data domain in the register 36 is meeting a control domain from path 49 in the gating region 87, these two domains reside simultaneously at the left-hand tips of the crossbars on the T element 88 and a further T element 92 when the in-plane field is oriented to the left. As the field reorients to its upward direction, the control domain moves to the upper end of the shank on T element 88 and exerts a repelling force on the data domain so that the latter domain is unable to assume its preferred position at the upper tip of the bar 89. Consequently, the data domain is diverted into its alternate path and takes up a position at the top of the shank on T element 92. Thereafter the data domain moves to the right-hand tip of the crossbar on element 92 and into a T element 93 of shift register 37 wherein the data domain is propagated upward to the detector 40. If the data domain propagating downward in register 36 had encountered no control domain in the gating region 87, the data domain would have assumed successive positions at the upper tip of bar 89, the right-hand tip of the crossbar in element 88, and the lower tip of bar 89 as the in-plane field rotated in its normal phase progression. It is thus seen that data domains propagating in register 36 normally utilize the right-hand tip of output T elements in the respective control coupling paths, such as the paths 48 and 49. There is, however, no interference with control domains because the normal time slot interchanger algorithm represented by the previously mentioned relationship among corresponding data and control memory position pairs, and respect to the manner of applying time coded signals for inserting domains into the control memory loops, do not allow a control domain to be present within a controlled gating region at shift register 36 unless a data domain is to be diverted in that region to the register 37.

Thus, it can be seen from FIGS. 2 and 3 that the use of a hybrid matrix for driving plural time slot interchangers through different amounts of propagation delay from a plurality of time division multiplex signal input circuits, facilitates the operation of a time slot interchanging stage which is implemented in planar shifting technology with a small number of signal bits for each time slot. Likewise, that same short time slot usage is further facilitated by the employment of spatially separated control memory loops having coupling propagation paths to time slot switcher gates that are controlled and having an erase circuit coupled to respond to a single electric circuit pulse for erasing corresponding time slot positions in all control memory loops simultaneously in anticipation of a new control memory writing operation.

Although the present invention has been described in connection with a particular embodiment thereof, it is understood that additional embodiments, modifications, and applications which will be obvious to those skilled in the art are included within the spirit and scope of the invention

What is claimed is:

1. In combination, a plurality of time division multiplex signal paths arranged as row circuits of a matrix for receiving time division multiplex signals which include for each row circuit plural time slot signals in recurrent time frames, a plurality of shift registers each comprising a different column signal path of said matrix and each having a register stage corresponding to each of said row circuits, said shift registers further including different numbers from 1 to $n$ of additional stages, respectively, where $n$ is the number of time slot signals per frame on a row circuit, means for selectively coupling each row circuit to a different shift register in each time slot of a frame and at a common corresponding stage of such registers for such row circuit, which common stage is different for each such row circuit, and means for operating all of said registers in unison whereby bit parallel input signals applied in the same time slot to said row circuits subsequently appear in bit series at the output of the one of said column shift registers which was selected during such time slot.

2. The combination in accordance with claim 1 in which said shift registers are magnetic single-wall domain propagation paths, and said selective coupling means comprise controllable magnetic domain generating means each having a data signal input from a row circuit of said matrix and a data signal output to one of said column shift registers, and an electric circuit control input in common for all of said generators which are coupled to a common one of said column shift registers.

3. In combination, a plurality of magnetic, single-wall domain, time slot interchangers, a plurality of signal delay means each having a different delay, a plurality of signal converters grouped so that a different group of said converters is associated with each of said interchangers, each of said converters being adapted for receiving an electric signal and converting such signal to a magnetic single-wall domain representation of the same signal, and means for applying the outputs of all converters of a group serially to an input of the associated interchanger through one of said delay means.

4. The combination in accordance with claim 3 in which means are provided for applying electric signals to said converters and include an electric circuit for simultaneously enabling a corresponding one of said converters of each of said time slot interchangers in accordance with the information content of an electric signal on such circuit, and means for recurrently enabling all of said converters of each of said time slot interchangers in a different time slot of a signal frame for each such interchanger.

5. The combination in accordance with claim 4 in which said recurrent enabling means comprises a ring counter having a plurality of outputs and being connected to be driven at the time slot rate of said electric signals, and means for coupling each of said counter outputs to an enabling input to all of said converters of a different one of said time slot interchangers.

6. The combination in accordance with claim 5 in which each of said converters comprises a magnetic single-wall domain generator connected to be actuated by a discrete one of said ring counter outputs, a magnetic single-wall domain collapser coupling an output of said generator to a unique input of said delay means for one of said electric signals, and means for connecting said collapser to be energized by such electric signal for allowing coupling to the delay means of such interchanger from said generator for only a predetermined signal state of such electric signal.

7. The combination in accordance with claim 3 in which each of said time slot interchangers comprises at least one magnetic single-wall domain propagation path, plural gating means distributed along said path for causing domain interaction between a data domain in said path and a control domain, and control memory means for supplying control domains to said gating means for selectively steering data domains through different ones of said gating means out of said propagation path in different time slots.

8. The combination in accordance with claim 7 in which each of said control memory loops includes domain collapsing means coupled to a different time slot position in such loop, and means are provided for simultaneously actuating all of said loop domain collapsing means in a selectable time slot of a signal frame.

9. The combination in accordance with claim 7 in which said control memory means comprises a plurality of domain loop circulating paths, means for coupling an output of each such loop path to a different one of said gating means, a loop path input at a corresponding loop position on each of said loop circulating paths, an address insertion shift register propagation path having sufficient stages to store a number of signal bits equal to the number of bits in a signal frame, and domain transfer means coupled between different time slot domain positions along the last-mentioned shift register and respective control memory loop inputs.

10. The combination in accordance with claim 9 in which said loop coupling means include signal delay paths of different delay propagation lengths distributed in decreasing delay size for gate means distributed along said shift register path from the input to the output of such path.

11. The combination in accordance with claim 7 in which said gating means are distributed along said one domain propagation path at signal bit intervals of $n$ bits, and each of said recirculation loops is more than $n$ bits in width in a direction that is parallel to the direction of propagation in said one path.

12. The combination in accordance with claim 7 in which said control memory means comprises a different recirculation control signal storage loop for storing a control signal pattern for each of said gating means, a plurality of domain propagation paths, each of a different length and coupled between one of said loops and one of said gating means for coupling control domains from such loop to said one domain propagation path for propagation therethrough to an end of the last-mentioned path, and means for applying control signal domains to a selectable one of said loops through different amounts of signal propagation delay, said applying means delay being proportioned for each loop with respect to the coupling path propagation delay for such loop so that the total propagation delay through said applying means and one of said loops to said end of said last-mentioned path is the same for any of said loops.

13. In combination, a plurality of time slot interchangers, a like plurality of signal propagation delay means each coupled for applying signals to inputs of respective ones of said interchangers, each delay means including a predetermined number of input stages and a different number of additional stages, a plurality of time division multiplex signal paths for receiving time division signals, said signals including on each path plural time slot signals in recurrent time frames, and means for controllably coupling time slot signals from all of said paths to respective input stages of a different one of said delay means in each time slot of a time frame.

* * * * *